July 25, 1950 M. L. THOMPSON 2,516,272

FREQUENCY CONVERSION SYSTEM

Filed Dec. 7, 1945 2 Sheets-Sheet 1

INVENTOR.
MILTON L. THOMPSON
BY HIS AGENT
Carl H. Lynnestvedt

July 25, 1950 M. L. THOMPSON 2,516,272

FREQUENCY CONVERSION SYSTEM

Filed Dec. 7, 1945 2 Sheets-Sheet 2

INVENTOR.
MILTON L. THOMPSON
BY HIS AGENT
Carl H. Synnestvedt

Patented July 25, 1950 2,516,272

UNITED STATES PATENT OFFICE 2,516,272

FREQUENCY CONVERSION SYSTEM

Milton L. Thompson, Huntingdon Valley, Pa., assignor, by mesne assignments, to Philco Corporation, Philadelphia, Pa., a corporation of Pennsylvania Application December 7, 1945, Serial No. 633,453

3 Claims. (Cl. 250—20)

This invention relates to improvements in systems for converting modulated carrier wave signals to carrier wave signals of substantially different frequencies but having essentially the same modulation as the original carrier wave signals. In particular it relates to improvements in such systems applicable to radio receivers adapted for the reception of signals in the very high frequency range, or for the reception of signals in this and in lower frequency ranges. Specifically these improvements are especially applicable in multi-band systems for the reception of both amplitude- and frequency-modulated signals, where, in accordance with present practice, amplitude-modulated signals are in a relatively low frequency range, while frequency-modulated signals are situated in the very high frequency range (88-108 megacycles).

The application of the superheterodyne principle in the amplification of both amplitude- and frequency-modulated carrier wave signals is well known. However, in the application of this principle to signals in the very high frequency range, difficulty may be experienced owing to the frequency instability of local oscillators used to generate signals to be mixed with the received signals to yield an intermediate frequency signal which is more conveniently amplified. Such frequency instability is particularly objectionable when the received signal to be amplified is frequency-modulated.

The principal object of this invention is to provide means for supplying a local oscillator signal of high frequency stability to the frequency converter tube of a superheterodyne radio receiver adapted for use in the reception of signals in the very high frequency range.

Another object of the invention is to provide, in a superheterodyne radio receiver adapted to the reception of signals in the very high frequency range, as well as in lower ranges, a source of a signal of inherently high frequency stability for mixing with the received very high frequency signal to produce an intermediate frequency signal, said source being separate from and substantially independent of the means used to provide local signals for mixing with the received signals of lower frequency, and therefore free from certain disturbances which would adversely affect its frequency stability.

Figure 1:
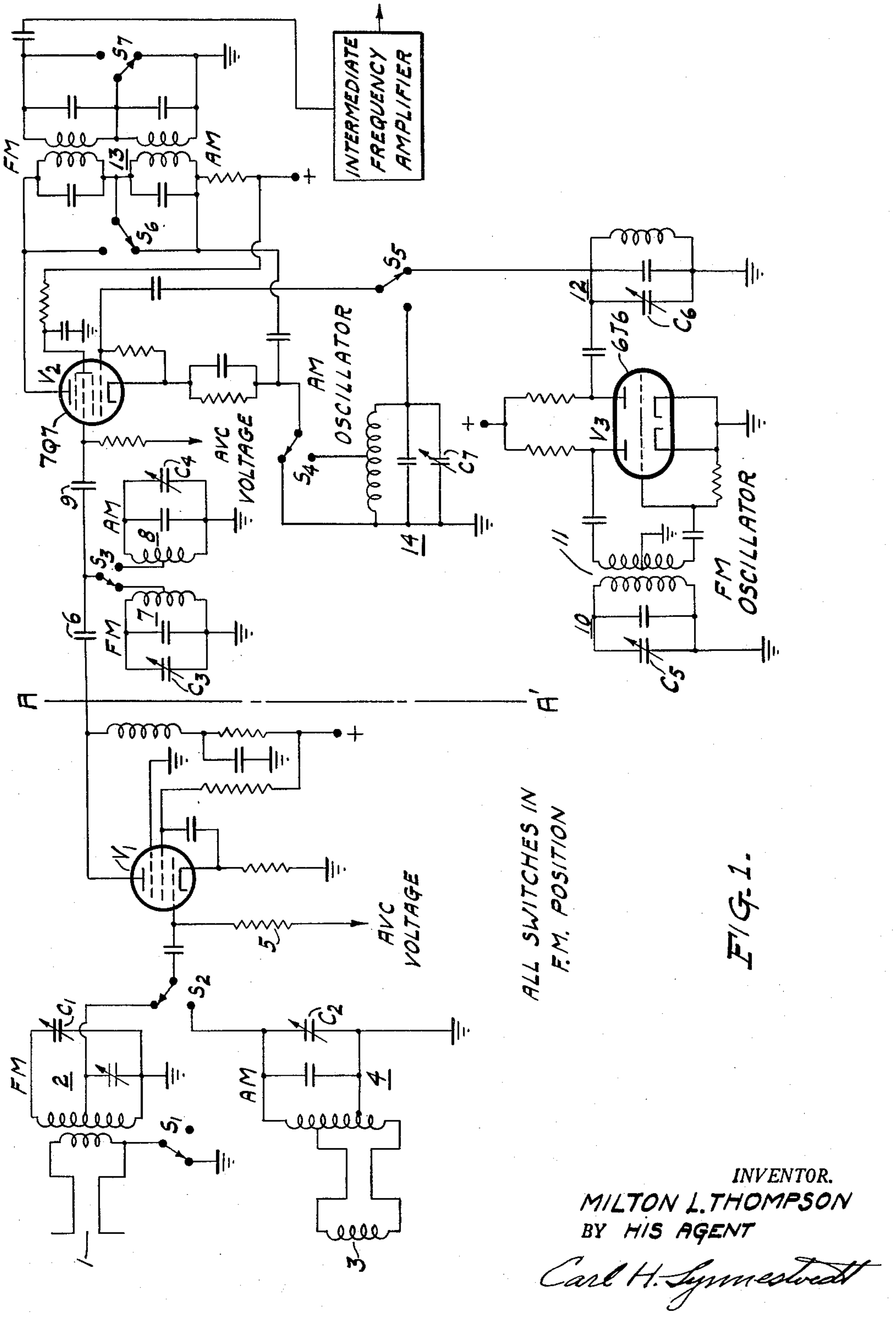
Figure 2:
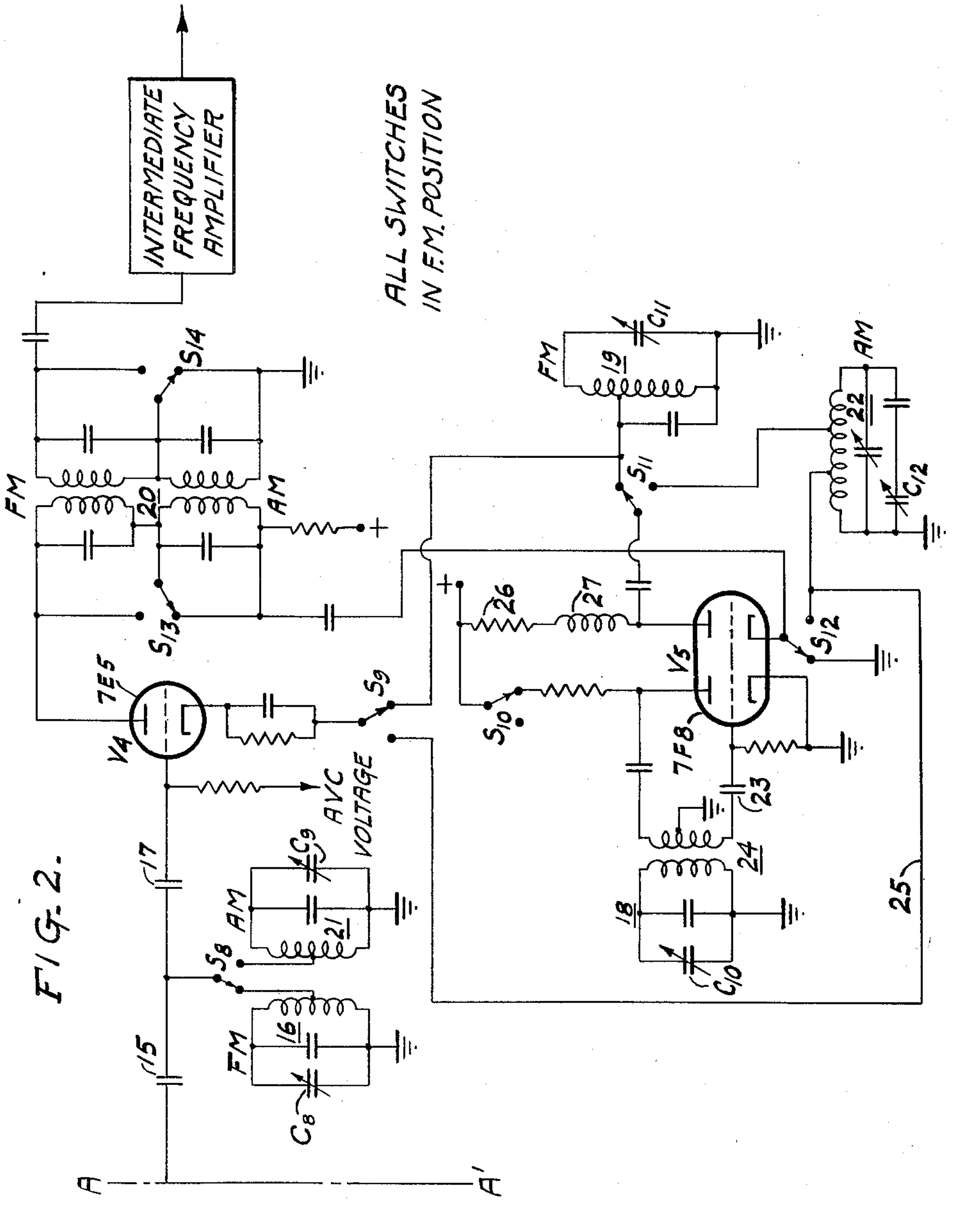

Other objects and features of the invention will be apparent from the following description and accompanying drawings in which:

Figure 1 is a schematic diagram of a portion of a radio receiver embodying one form of the invention, in which a commercial type 6J6 tube is used as an oscillator and frequency multiplier on the very high frequency (frequency modulation) band, while a type 7Q7 is used as a frequency converter on the frequency modulation (FM) band and as a local oscillator-converter on other and lower frequency bands. Although, for purposes of simplicity in explanation, only one low frequency band is provided for in the circuit illustrated, it is to be understood that additional bands could be provided for in a manner which is familiar to those skilled in the art; and Figure 2 is a schematic diagram of a variation of the portion of the circuit shown to the right of A—A′ in Figure 1 embodying a somewhat different form of the invention, in which a type 7E5 tube is used as a converter to obtain lower input capacity and higher input resistance and in which one section of a type 7F8 tube, when not functioning as a frequency multiplier and buffer stage, is used as a local oscillator in the reception of amplitude-modulated signals in the lower frequency ranges.

Referring now to Figure 1, to the left of line A—A′ are shown circuits for the reception and radio frequency amplification of modulated carrier wave signals in very high frequency and in lower frequency ranges. These signals may, as has already been suggested, be respectively frequency-modulated and amplitude-modulated signals in accordance with the present practice in this country of using carrier frequencies in the very high frequency range for frequency modulated transmission, and carrier frequencies in relatively lower frequency ranges for amplitude modulated transmission. In view of this practice, and in view of the fact that the specific embodiments of the invention here disclosed are particularly adapted for the reception of both amplitude- and frequency-modulated signals, the terms frequency-modulated signal and amplitude modulated signal may be regarded as denoting modulated carrier wave signals in the very high frequency range and in lower frequency ranges respectively. In any event the use of these terms in general should not be regarded as limiting the invention to use with signals of any particular form or type of modulation.

The circuits shown to the left of line A—A′ in Figure 1 are conventional and need not be discussed in detail. 1 is a dipole antenna adapted to intercept frequency-modulated signals and, with switches $S_1$ and $S_2$ in the position shown, supply them through coupling means 2 to the control grid of a radio frequency amplifier tube $V_1$. With switches $S_1$ and $S_2$ both in their alternative positions, amplitude-modulated signals intercepted by the loop antenna 3 will be supplied to the control grid of the radio frequency amplifier, $V_1$, through coupling means 4. Automatic volume control voltage, derived in a conventional manner at a subsequent stage of the receiver (not shown), may also, if desired, be applied to the control grid of tube $V_1$ through the grid leak resistor 5 in the manner shown.

Depending on the positions of the switches $S_1$, $S_2$ and $S_3$, either frequency-modulated signals will be supplied through the blocking condenser 6 to the circuit 7 which is variably tunable to signals in the FM range, or amplitude-modulated signals will be supplied to the circuit 8 which is variably tunable over the AM range. Signal voltages developed across either of these tunable circuits are supplied through blocking condenser 9 to a control grid of a pentagrid converter tube $V_2$.

With switches $S_1$ through $S_7$ positioned for FM reception as shown in the schematic of Figure 1, local oscillator signal is supplied from a special frequency multiplier arrangement operating in the following manner. An oscillator, comprising a tuned circuit 10 loosely coupled between the plate and grid of the first section of the tube $V_3$ through the secondary winding of the transformer 11, generates a signal at a frequency corresponding to the third subharmonic of the signal desired for mixing with the frequency-modulated carrier wave signal to produce an intermediate frequency signal suitable for convenient amplification. If, for example, the desired intermediate frequency is 9.1 megacycles and the FM band to be covered is from 88 to 108 megacycles, the circuit 10 might be made tunable by means of the variable condenser $C_5$ from 26 to 33 megacycles allowing for some overlap at each end of the band to take account of tolerances in other circuit parameters. The signal thus generated is fed directly to the grid of the second section of tube $V_3$, which may be a commercial type 6J6, in the plate circuit of which is disposed a circuit 12 variably tunable, by means of the condenser $C_6$, throughout the range of the third harmonic of the oscillator frequency (i. e. 78 to 99 megacycles). This tube section acts, therefore as a frequency multiplier and buffer stage. The signal developed across this tuned circuit is fed to a grid of the converter tube $V_2$, which may be a commercial type 7Q7, and is thereby injected into the tube where it is mixed with the incoming frequency-modulated signal applied to the control grid to produce in the output circuit of tube $V_2$ a frequency modulated intermediate frequency signal which is supplied through the upper section of the coupling transformer 13 to an intermediate frequency amplifier. This amplifier may be of conventional design as may the remaining receiver circuits, which are neither shown nor described, and may be adapted for the amplification of either FM or AM signals as desired.

According to the invention, the oscillator just described is used only to supply the local oscillator signal for use in converting received signal frequencies in the FM band. Separate means are provided to generate the local oscillator signal used in converting received signals in lower frequency ranges and thereby a number of factors adversely affecting the frequency stability of the FM oscillator are eliminated. In the embodiment of Figure 1 the converter tube $V_2$ is made to serve also as a source of local oscillator signal for the frequency conversion of signals in the AM or lower frequency range. To this end, with the switches $S_4$ and $S_5$ in the positions alternative to those shown, the tunable circuit 14 is connected in circuit with the cathode and first two grids of the tube $V_2$ to form an oscillatory circuit, the signal from which is injected directly into the tube $V_2$ for mixing with the incoming AM signal. Assuming that the AM band to be received extends from 550 to 1600 kilocycles (the standard broadcast band), and that an intermediate frequency of 455 kilocycles is desired, the AM oscillator may be made variable from 1005 to 2055 kilocycles by varying the capacity of the condenser $C_7$. Likewise, for the reception of signals in other AM bands, switching means might be provided, adapted to alter the fixed parameters of circuit 14 so as to make the frequency of the oscillator variable over other ranges and to yield the same intermediate frequency or a different one. For the reception of AM signals switches $S_6$ and $S_7$ are placed in the positions alternative to those shown, and intermediate frequency signals derived from the output circuit of tube $V_2$ are supplied through the lower section of the tuned transformer 13 to the intermediate frequency amplifier and subsequent conventional receiver circuits.

As indicated in the diagram of Figure 1, A. V. C. voltage may be applied to the input grid of the converter tube $V_2$ as well as to the radio frequency amplifier tube $V_1$ and other subsequent stages not shown. It is significant and a feature of the invention that this may be done without adversely affecting the frequency stability of the FM oscillator because the latter is effectively isolated from the converter $V_2$ by the frequency multiplier and buffer stage comprising the second section of the tube $V_3$.

Advantages of the arrangement just described for obtaining local oscillator signal for use in converting the frequency of received frequency-modulated signals in the very high frequency range are as follows:

(1) The higher tuned impedance obtainable in the oscillator tank circuit 10 because of the lower frequency at which the oscillator is operated, together with the choice of a tube of low capacity and high mutual conductance, permits loose coupling of the tube to the oscillator tank circuit which greatly reduces the effect of tube interelectrode capacities on the oscillator frequency.

(2) The use of a lower oscillator frequency and the consequent higher circuit inductance minimizes the effect of lead inductance on the oscillator frequency.

(3) The use of the oscillator only in connection with the reception of signals in the FM band, and the consequent elimination of switching in the oscillator circuit, greatly reduces the amount of unstable inductance and capacity in the oscillator circuit and thereby greatly improves its stability.

(4) Since the oscillator is not directly coupled to the converter, the possibility of spurious responses owing to heterodyning of incoming signals with harmonics generated by the oscillator is greatly lessened.

(5) Automatic volume control may be applied to the converter tube without affecting the frequency of the oscillator.

(6) The greater amplification provided by the use of the tuned buffer stage permits the operation of the oscillator at a lower sub-harmonic of the frequency desired for mixing purposes than would otherwise be possible, while maintaining the translation gain of the frequency converter, thereby making possible greater oscillator stability.

Reference is now made to Figure 2, which represents a variation of the circuits to the right of line A—A' in Figure 1 in accordance with another embodiment of the invention. With switch $S_8$ in the position shown, frequency modulated signals supplied from conventional circuits to the left of the line A—A' through the blocking condenser 15 will be developed across the circuit 16 which is tunable by means of the variable condenser $C_8$ to frequencies in the FM range. These signals are supplied through a blocking condenser 17 to the grid of tube $V_4$, which may be a commercial type 7E5, used in this embodiment of the invention, because of its lower input capacity and higher input resistance, to provide greater gain than can be obtained from the 7Q7 used in the embodiment of Figure 1. Local oscillator signal for effecting the frequency conversion of the frequency modulated signal is obtained from an oscillator-frequency multiplier arrangement similar to that shown in the first embodiment, except that in this instance the oscillator comprising the variably tunable circuit 18 and the first section of the tube $V_5$, which may be a commercial type 7F8, is operated at the second subharmonic of the desired local oscillator signal. This is done to obtain a higher signal voltage for injection into the cathode circuit of tube $V_4$. The signal generated by this oscillator is fed directly to the grid of the second section of tube $V_5$, from the tunable circuit 19 in the output of which, signal is fed to the cathode of $V_4$. The load impedance in the output circuit of this section may include, in addition to the resistor 26, an inductor 27 adapted to raise the level of the second harmonic output. The circuit 19 may be tunable by means of the variable condenser $C_{11}$ to frequencies in the range from 78 to 99 megacycles to provide coverage of the 88–108 megacycle FM band with an intermediate frequency of 9.1 megacycles. For FM reception switches $S_8$ through $S_{14}$ should be in the positions shown. In this instance intermediate frequency signal will appear in the output circuit of tube $V_4$ and will be supplied through the upper section of the tuned coupling transformer 20 to the intermediate frequency amplifier and subsequent conventional receiver circuits (not shown).

For the reception of AM signals switches $S_8$ through $S_{14}$ should be in the positions alternative to those shown. Then AM signals developed across circuit 21, tunable by means of variable condenser $C_9$ over the AM band, will be supplied to the input grid of $V_4$. In this instance, local oscillator voltage is generated in an oscillator comprising the second section of tube $V_5$ and the circuit 22 tunable by means of the variable condenser $C_{12}$ over the desired range of local oscillator frequencies. The plate and cathode of this tube section are connected to taps on inductor 28 of the tunable circuit in the manner shown. The grid is effectively grounded at these frequencies through the blocking condenser 23 and one-half of the secondary winding of transformer 24, and hence is connected to the grounded end of tuned circuit 22. Local oscillator signal is supplied from a tap on the inductor of tunable circuit 22 through lead 25 to the cathode of tube $V_4$. In the AM case, the intermediate frequency signal developed in the output circuit of tube $V_4$ is supplied through the lower section of the tuned coupling transformer 20 to the intermediate frequency amplifier and subsequent circuits.

Although the invention has been described with particular reference to radio receivers for the reception of modulated carrier wave signals in the standard FM and AM bands and to the embodiments illustrated in the drawings, it will be understood that the invention is generally applicable to radio receivers for the reception of such signals in the very high frequency range and in lower ranges, and adapted to other forms of physical expression, and is therefore not to be limited to the specific disclosure.

I claim:

1. In a superheterodyne radio receiver for selectively receiving modulated carrier wave signals in different frequency ranges; a frequency converted stage comprising a first electron discharge device having plural electrodes and being operative in response to incoming modulated carrier wave signals and local oscillations supplied respectively to different ones of said electrodes to convert said incoming signals to an intermediate carrier frequency; a source of local oscillations suitable for effecting conversion of modulated carrier wave signals within one of said ranges, said source comprising an oscillator and a harmonic generator circuit supplied with oscillations from said oscillator and operative to generate local oscillations which are harmonically related to the oscillations produced by said oscillator, said generator incorporating a second electron discharge device; resonant circuit means cooperative with one of said electron discharge devices to provide a second oscillator constituting a source of local oscillations suitable for effecting conversion of modulated carrier wave signals within the other of said ranges; and means for selectively rendering said sources effective to supply local oscillations to said converter stage.

2. In a superheterodyne radio receiver for selectively receiving modulated carrier wave signals in different frequency ranges; a frequency converter stage comprising a first electron discharge device having plural electrodes and being operative in response to incoming modulated carrier wave signals and local oscillations supplied respectively to different ones of said electrodes to convert said signals to an intermediate carrier frequency; a source of local oscillations suitable for effecting conversion of modulated carrier wave signals within one of said ranges, said source comprising an oscillator incorporating a second electron discharge device; resonant circuit means cooperative with said first electron discharge device to provide a second oscillator constituting a source of local oscillations suitable for effecting conversion of modulated carrier wave signals within the other of said ranges; and means for selectively rendering said sources effective to supply local oscillations to said converter stage.

3. In a superheterodyne radio receiver for selectively receiving modulated carrier wave signals in different frequency ranges; a frequency converter stage comprising a first electron discharge device having plural electrodes and being operative in response to incoming modulated carrier wave signals and local oscillations supplied respectively to different ones of said electrodes to convert said incoming signals to an intermediate carrier frequency; a source of local oscillations suitable for effecting conversion of modulated carrier wave signals within one of said ranges, said source comprising an oscillator circuit, incorporating a second electron discharge device, and a harmonic generator circuit supplied with oscillations from said oscillator and operative to generate local oscillations which are harmonically related to the oscillations produced by said oscillator, said generator incorporating a third electron discharge device; a source of local oscillations suitable for supply to said converter stage to effect conversion of modulated carrier wave signals within the other of said ranges, said source comprising a second oscillator circuit incorporating said third electron discharge device, and means for selectively applying local oscillations produced by either of said sources to said converted stage.

MILTON L. THOMPSON.

REFERENCES CITED

The following references are of record in the file of this patent:

UNITED STATES PATENTS

| Number | Name | Date |
|---|---|---|
| 2,038,285 | Harris | Apr. 21, 1936 |
| 2,069,518 | Chittick | Feb. 2, 1937 |
| 2,159,159 | Horl | May 23, 1939 |
| 2,186,980 | Lowell | Jan. 16, 1940 |
| 2,211,352 | Simpson | Aug. 13, 1940 |
| 2,263,634 | Landon | Nov. 25, 1941 |
| 2,295,383 | Carlson | Sept. 8, 1942 |
| 2,354,959 | McCoy | Aug. 1, 1944 |
| 2,443,935 | Shea | June 22, 1948 |
| 2,468,041 | Couillard | Apr. 26, 1949 |